E. TUTTLE & G. W. KEITH.
VEHICLE TRAILER POLE HOOK.
APPLICATION FILED AUG. 4, 1917.
1,265,143.
Patented May 7, 1918.
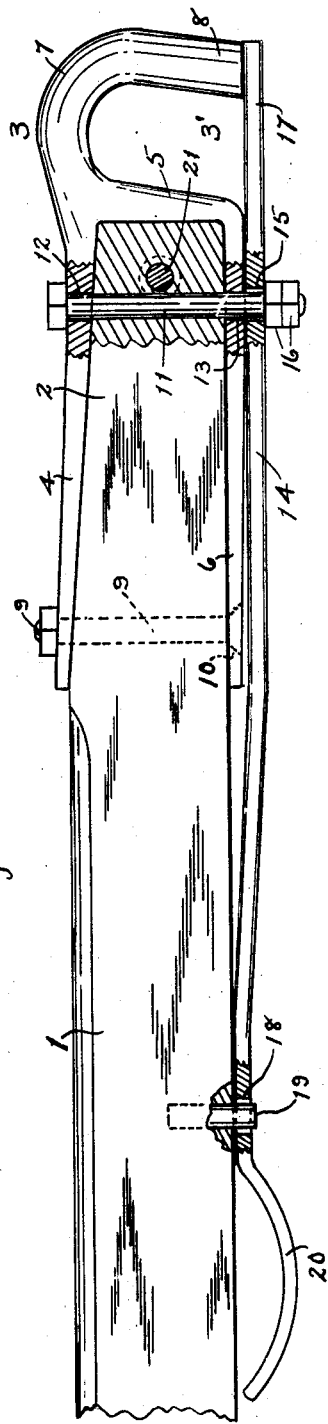
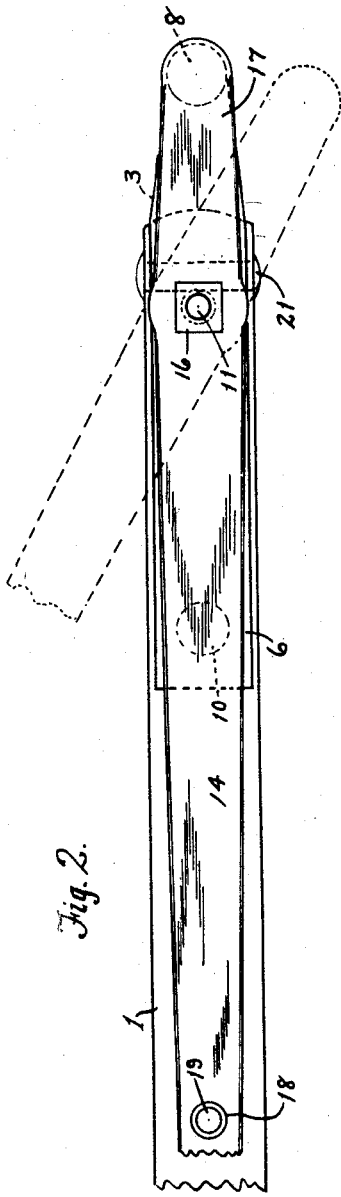
INVENTORS.
Edward Tuttle
George W. Keith
By Louis C. Vanderlip
Atty.

UNITED STATES PATENT OFFICE.

EDWARD TUTTLE AND GEORGE W. KEITH, OF SENECA, MICHIGAN.

VEHICLE-TRAILER-POLE HOOK.

1,265,143.  Specification of Letters Patent.  Patented May 7, 1918.

Application filed August 4, 1917. Serial No. 184,396.

*To all whom it may concern:*

Be it known that we, EDWARD TUTTLE and GEORGE W. KEITH, citizens of the United States, and residents of Seneca, Lenawee county, State of Michigan, have invented certain new and useful Improvements in Vehicle-Trailer-Pole Hooks, of which the following is a specification.

Our invention relates to vehicle trailer poles and more especially to the pole tip or hook with which a link or connection is effected by or from a tractor vehicle.

The principal object of our invention is the production of a device of the class described which is simple, cheap, very effective, and exceedingly durable. Another object is the production of a hook of the kind described having rapidly operative means for opening and closing the hook socket and simply and securely locking said means. Other collateral objects of our invention are hereinafter described.

The preferred embodiment of our invention is well illustrated in the accompanying drawings, in which Figure 1 is a view in side elevation of the invention applied to the end of a vehicle trailer pole; and Fig. 2 is a bottom plan view of the members shown in Fig. 1. Similar numerals of reference indicate like members and parts of members throughout the several figures on the drawings.

Referring to the drawings in detail, the numeral 1 indicates a trailer vehicle pole having a tip or end portion 2 which is adapted to receive the pole hook member 3, the latter having a socket 3′ which is adapted to be engaged or occupied by any suitable link connection extending from a vehicle tractor member for traction purposes. The numerals 4 and 6 indicate upper and lower hook straps, respectively, which are connected by the wall section 5 and adapted to receive fastener members for securing the hook member to the pole end 2.

Numeral 7 indicates the curved portion of the hook 3 which terminates in the relatively straight portion and downwardly projecting member 8. Numeral 9 indicates a hook strap bolt penetrating both straps 4 and 6 and provided with a counter sunk head 10 to bring the bolt head flush with the outer surface of the strap 6. Numeral 11 indicates a strap bolt penetrating bolt apertures 12 and 13 formed in the straps 4 and 6, respectively, and having a portion, or end, thereof projecting substantially beyond the aperture 13 to function as a mount for the closure lever hereinafter described.

Numeral 14 indicates a hook closure lever pivotally mounted on the bolt extension of the bolt 11, the latter being arranged in the pivot aperture 15 of said lever, said lever being confined on said bolt extension by the nuts 16, 16 which are screw threaded thereon. The closure lever 14 is provided with an extension arm 17 projecting forward of the pivot point 15 which arm is adapted to be swung across the mouth of the hook socket 3′ and into and out of engagement with the hook point 8 for alternately closing and opening said socket, to enable the introduction of a ring or like member into said socket.

Numeral 18 indicates an aperture formed in the lever 14 and adapted to be engaged by the pin 19 which is rigidly fastened in the body of the pole 1 and projecting therefrom for locking the lever 14 detachably against casual lateral movement. The lever 14 is preferably made of any suitable springy metal, whereby the operator may, by grasping the lever handle 20, spring the locking pin aperture 18 into and out of engagement with the pin 19.

The numeral 21 indicates a reinforcing bolt penetrating the pole end 2 preferably between the bolt 11 and the wall member 5 and substantially at right angles to the former.

We claim:

1. A device of the class described comprising a pole; a hook having a bill secured to the pole end; a fastener member carried by the pole; and a hook closure member pivotally mounted adjacent the hook bill and provided with a springy extension member which is adapted to be sprung into and out of engagement with said fastener member, said closure member being adapted to be swung transversely of the hook bill for opening or closing it.

2. A device of the class described comprising a pole; a hook having a bill secured to the pole end; a fastener pin rigidly mounted in the pole remote from the hook bill; and a hook closure member pivotally mounted adjacent the hook bill and provided with an apertured springy extension member the aperture whereof is adapted to be sprung into and out of engagement with said fastener pin, said closure member being adapted to be swung transversely of the hook bill for opening or closing it.

In testimony whereof we have hereunto affixed our signatures this 31st day of July, 1917.

EDWARD TUTTLE.
GEORGE W. KEITH.

Copies of this patent may be obtained for five cents each, by addressing the "Commissioner of Patents Washington, D. C."